US009898732B2

(12) United States Patent
Murphy et al.

(10) Patent No.: US 9,898,732 B2
(45) Date of Patent: Feb. 20, 2018

(54) SECURELY GENERATING TIME AND LOCATION BOUNDED VIRTUAL TRANSACTION CARDS USING MOBILE WALLETS WITHOUT INVOLVING THIRD PARTIES OR POINT OF SALE TERMINALS

(75) Inventors: Kaitlin A. Murphy, Hillsboro, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 13/977,112

(22) PCT Filed: Mar. 31, 2012

(86) PCT No.: PCT/US2012/031749
§ 371 (c)(1),
(2), (4) Date: Sep. 17, 2014

(87) PCT Pub. No.: WO2013/147904
PCT Pub. Date: Oct. 3, 2013

(65) Prior Publication Data
US 2015/0019427 A1    Jan. 15, 2015

(51) Int. Cl.
*G06Q 20/10* (2012.01)
*G06Q 40/00* (2012.01)
(Continued)

(52) U.S. Cl.
CPC ......... *G06Q 20/351* (2013.01); *G06Q 20/322* (2013.01); *G06Q 20/3224* (2013.01);
(Continued)

(58) Field of Classification Search
CPC ........ G06Q 20/10; G06Q 40/00; G06Q 40/02; G07F 7/1008; H04L 63/08
(Continued)

(56) References Cited

U.S. PATENT DOCUMENTS 6,931,382 B2 *  8/2005  Laage .................... G06Q 20/02
                                                        705/64
7,434,723 B1   10/2008  White et al.
(Continued)

FOREIGN PATENT DOCUMENTS

EP          2357598 A2        8/2011
KR     2009-0121026 A        11/2009
(Continued)

OTHER PUBLICATIONS

European Search Report received for EP Patent Application No. 12872787.2, dated Nov. 6, 2015, 8 pages.
(Continued)

*Primary Examiner* — Sara C Hamilton
(74) *Attorney, Agent, or Firm* — Jordan IP Law, LLC

(57) ABSTRACT

Methods and systems may provide for generating a virtual transaction card based on a card value and one or more mobile usage constraints including a time bounded policy, wherein the virtual transaction card is invalid if the time bounded policy is not satisfied. Additionally, the virtual transaction card may be transmitted to a delegate mobile device. Other mobile usage constraints, such as location bounded policies and type of transaction policies may also be used.

23 Claims, 2 Drawing Sheets

(51) Int. Cl.
*G06Q 40/02* (2012.01)
*G06Q 20/34* (2012.01)
*G06Q 20/32* (2012.01)
*G06Q 20/36* (2012.01)
*G06Q 20/40* (2012.01)
*G06Q 20/42* (2012.01)

(52) U.S. Cl.
CPC ..... *G06Q 20/3227* (2013.01); *G06Q 20/3278* (2013.01); *G06Q 20/35785* (2013.01); *G06Q 20/363* (2013.01); *G06Q 20/405* (2013.01); *G06Q 20/42* (2013.01)

(58) Field of Classification Search
USPC ....... 705/39, 40, 44; 235/380, 382; 713/168, 713/193
See application file for complete search history.

(56) References Cited

U.S. PATENT DOCUMENTS

| | | | |
|---|---|---|---|
| 8,127,982 B1 | 3/2012 | Casey et al. | |
| 8,397,988 B1* | 3/2013 | Zuili | G06Q 20/341 235/383 |
| 8,622,309 B1 | 1/2014 | Mullen | G06Q 20/347 235/492 |
| 2003/0028481 A1* | 2/2003 | Flitcroft | G06Q 20/00 705/39 |
| 2003/0197058 A1* | 10/2003 | Benkert | G06Q 20/227 235/380 |
| 2004/0039694 A1* | 2/2004 | Dunn | G06Q 20/04 705/39 |
| 2004/0143527 A1* | 7/2004 | Benkert | G06Q 20/04 705/35 |
| 2006/0235795 A1 | 10/2006 | Johnson et al. | |
| 2007/0017976 A1* | 1/2007 | Peyret | G06Q 20/10 235/380 |
| 2007/0078760 A1* | 4/2007 | Conaty | G06Q 20/02 705/39 |
| 2007/0130062 A1* | 6/2007 | Huh | G06Q 20/10 705/39 |
| 2010/0019034 A1* | 1/2010 | Sherf | G06Q 20/1235 235/382 |
| 2010/0082487 A1* | 4/2010 | Nelsen | G06Q 20/10 705/44 |
| 2010/0088188 A1 | 4/2010 | Kumar et al. | |
| 2010/0138344 A1* | 6/2010 | Wong | G06Q 20/10 705/44 |
| 2010/0288834 A1* | 11/2010 | Tichelaer | G06Q 20/04 235/380 |
| 2010/0312704 A1* | 12/2010 | Rohatgi | G06Q 20/40 705/44 |
| 2011/0106696 A1* | 5/2011 | Seven | G06Q 20/06 705/40 |
| 2012/0016731 A1* | 1/2012 | Smith | G06Q 20/20 705/14.33 |
| 2012/0159163 A1* | 6/2012 | von Behren | G06Q 20/3552 713/168 |
| 2012/0159195 A1* | 6/2012 | von Behren | G06Q 20/3552 713/193 |
| 2013/0085938 A1* | 4/2013 | Stone | G06Q 40/02 705/41 |
| 2013/0159121 A1* | 6/2013 | May | G06Q 30/06 705/26.1 |

FOREIGN PATENT DOCUMENTS

| | | |
|---|---|---|
| KR | 10-2011-0105746 A | 9/2011 |
| KR | 2011-0105746 A | 9/2011 |
| KR | 10-2011-0129038 A | 12/2011 |
| WO | WO2013147904 A1 | 10/2013 |

OTHER PUBLICATIONS

Dustin Karnes, "MasterCard CSI globalVCard Steps onto Mobile Payment Scene, Available to Nearly 92% of Smartphone Users", Oct. 11, 2011, Retrieved from: <"web.archive.org/web/20120322154822/http://www.androidguys.com/2011/10/11/mastercard-csi-globalvcard-steps-mobile-payment-scene-92-smartphone-users/">, 4 pages.

Office Action received for Korean Patent Application No. 2014-7027411, dated Aug. 17, 2015, 12 pages including 5 pages of English translation.

Office Action for Korean Patent Application No. 2014-7027411, dated Feb. 29, 2016, 7 pages including 3 pages of English translation.

International Preliminary Report on Patentability received for PCT Patent Application No. PCT/US2012/031749, dated Oct. 9, 2014, 6 pages.

International Search Report and Written Opinion received for PCT application No. PCT/US2012/031749, dated Nov. 29, 2012, 9 pages.

Final Rejection for Korean Patent Application No. 2014-7027411, dated Sep. 29, 2016, 6 pages including 2 pages of English translation.

Office Action for Korean Patent Application No. 2014-7027411, dated Dec. 2, 2016, 9 pages including 4 pages of English translation.

* cited by examiner

US 9,898,732 B2

SECURELY GENERATING TIME AND LOCATION BOUNDED VIRTUAL TRANSACTION CARDS USING MOBILE WALLETS WITHOUT INVOLVING THIRD PARTIES OR POINT OF SALE TERMINALS

BACKGROUND

Technical Field

Embodiments generally relate to authorizing transactions. More particularly, embodiments relate to the use of virtual transaction cards to authorize transactions in mobile environments.

Discussion

Conventionally, in order to authorize another individual to make transactions with respect to a credit card account, either the account holder's card may be given to the other individual or the other individual may be issued a credit card with his or her name on it. Such an approach may present challenges with regard to controlling spending, particularly when the other individual is a teenager, adolescent, etc. While an alternative approach may be to purchase a gift card for the other individual, certain challenges remain. For example, purchasing a gift card (e.g., via third party or point of sale terminal) may involve a separate transaction, which may be inconvenient and time consuming for the account holder. Moreover, traditional gift cards may be limited to controlling the maximum amount spent and/or particular retailer.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
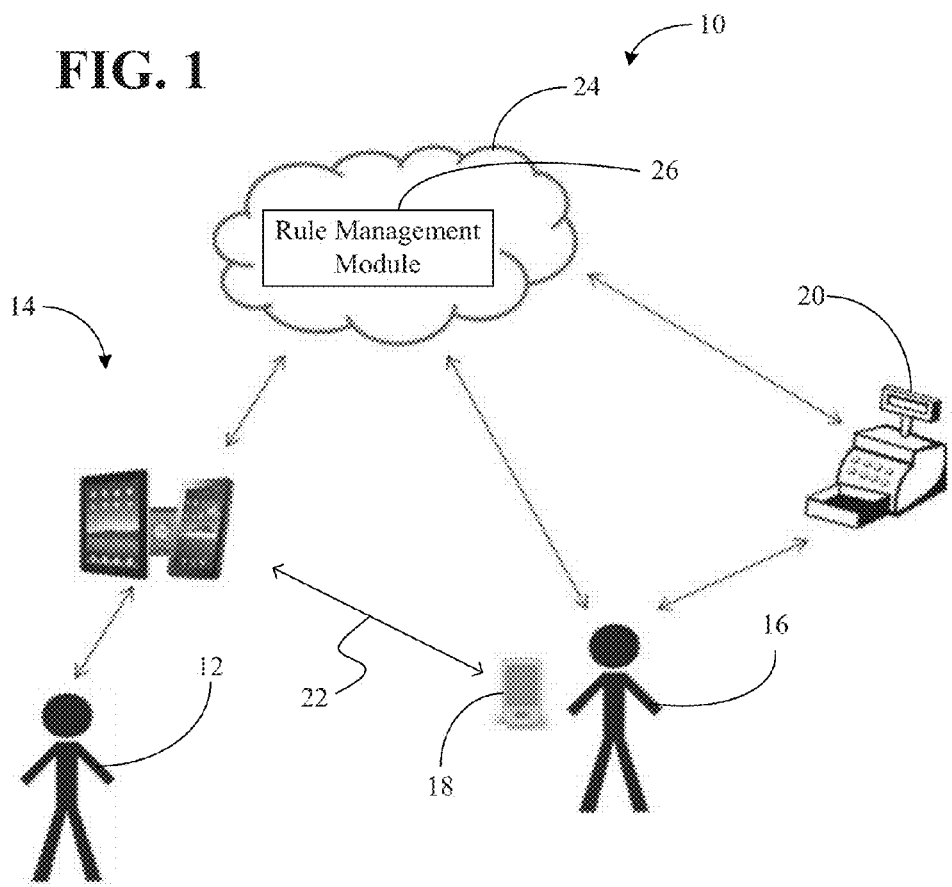
FIG. 1 is a block diagram of an example of an architecture to authorize transactions according to an embodiment.

Turning now to FIG. 1, an architecture 10 to authorize transactions is shown. Generally, an account holder/subscriber 12 may have a credit and/or debit card account that enables the subscriber 12 to make purchases at retail locations, on web sites, etc., without the need for cash in order to complete the transactions. In the illustrated example, the subscriber 12 may use one or more devices 14 to issue a virtual transaction card to a mobile device 18 associated with a delegate 16, wherein the delegate 16 may use the virtual transaction card to make one or more purchases at a point of sale terminal 20, web site, or other commercial transaction location. In one example, the devices 14 include "mobile wallet" functionality that enables the subscriber 12 to conduct financial transactions in a secure environment on the devices 14. Of particular note is that the subscriber 12 may generate the virtual transaction card without involving third parties or point of sale terminals. For example, the illustrated devices 14 execute secure logic that is able to set the value of the virtual transaction card as well as one or more mobile usage constraints, without conducting a separate transaction, wherein the virtual transaction card may be delivered to the mobile device 18 via a near field communications link 22 or other connection such as a network interface link. The card value may be a relatively small value (e.g., in relation to the amount of available credit in the account), which may enable the subscriber 12 to tightly control the purchases made by the delegate 16.

Moreover, the mobile usage constraints may provide even greater control over the purchases of the delegate 16, relative to conventional solutions. For example, the subscriber 12 may set a time bounded policy for the virtual transaction card, wherein if the time bounded policy is not satisfied, the card is deemed invalid at the time of the attempted purchase. Thus, if the subscriber 12 stipulates that the virtual transaction card must be used within the next twenty-four hours, if the delegate 16 attempts to use the card to make a purchase after the twenty-four hour period has expired, the attempted transaction may be denied at, for example, the point of sale terminal 20.

Additionally, the subscriber 12 may set a location bounded policy for the virtual transaction card, wherein if the location bounded policy is not satisfied, the card is invalid. Thus, if the subscriber 12 stipulates that the virtual transaction card must be used within a particular geographic radius, at a particular store, or on a particular web site, if the delegate 16 attempts to make a purchase at a different location or web site, the attempted transaction may be denied at, for example, the point of sale terminal 20. The location bounded policy may also indicate that a particular store or web site is prohibited, wherein if the delegate 16 attempts to make a purchase at the prohibited store or web site, the attempted transaction may be denied. Other mobile usage constraints such as transaction type policies (e.g., genre, type of product or service), number of transactions, and so forth, may also be used.

Indeed, the mobile usage constraints could also define more advanced policies for the delegate 16 such as 1) setting "X" number of additional pre-paid cards that may be generated through the delegate's virtual transaction card (e.g., additional card policy), 2) eliminating user ID/authentication checks for such pre-paid cards while linking the identification information of the delegate's virtual transaction card to the subscriber's card (e.g., authentication policy), 3) digitally linking pre-approved information (e.g., subscriber's last four social security number digits) to the delegate's mobile wallet, wherein the linked information can be associated with the delegate's virtual transaction card when needed, 4) preventing the generation of new virtual transaction cards to the delegate until outstanding balances have been paid, and so forth.

In order to facilitate the management of the virtual transaction cards, parameters of the generated virtual transaction cards may be transmitted to a rule management module 26 in a cloud computing infrastructure 24, wherein the management module may be responsible for aggregating and maintaining all rules associated with a specific account, and reporting (e.g., via emit, text or other mode of communication) the activities of the delegate 16 to the subscriber 12. Of particular note, however, is that the devices 14 may generate the virtual transaction cards and distribute them to their respective delegates without conducting a financial transaction, authorization, etc., with regard to the management module 26 or other payment system component. Rather, the illustrated management module 26 merely provides the virtual card information (e.g., card values, mobile usage constraints) needed to conduct real-time approval of purchase requests at product and/or service providers such as, for example, the point of sale terminal 20.

In this regard, the point of sale terminal 20, may also include a rule module (not shown) that receives card information entered by the user and verifies the satisfaction of the appropriate policies/constraints with the management module 26 in real-time. The point of sale terminal 20 may also send transaction notifications to the subscriber 12. Alternatively, the mobile device 18 of the delegate 16 may be configured to run an account management application that provides transaction notifications to the subscriber 12.

Figure 2:
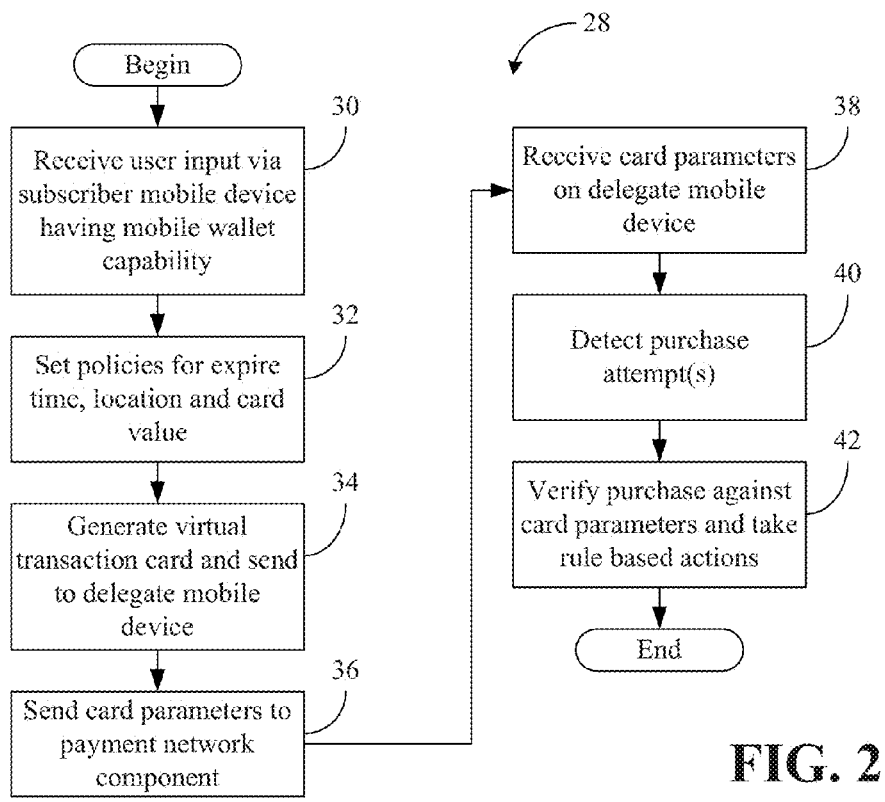
FIG. 2 is a flowchart of an example of a method of authorizing transactions according to an embodiment.

FIG. 2 shows a method 28 of authorizing transactions. The method 28 may be implemented as a set of executable logic instructions stored in at least one machine- or computer-readable storage medium such as random access memory (RAM), read only memory (ROM), programmable ROM (PROM), flash memory, firmware, microcode, etc., in configurable logic such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 28 may be written in any combination of one or more programming languages, including an object oriented programming language such as C++ or the like and conventional procedural programming languages, such as the "C" programming language or similar programming languages. Moreover, various aspects of the method 28 could be implemented as embedded logic of a processor using any of the aforementioned circuit technologies.

Illustrated processing block 30 provides for receiving user input via a subscriber mobile device having a mobile wallet capability, wherein block 32 may involve identifying a card value and one or more mobile usage constraints based on the user input. Thus, the user input may be used to set policies for an expiration time, a location, a card value, and so forth, in the illustrated example. A virtual transaction card may be generated based on the card value and mobile usage constraints, and sent to a delegate mobile device at block 34. In one example, a secure processing element on a subscriber mobile device is used to generate and send the virtual transaction card, wherein the card may be transmitted via a near field communications (NFC) module, network interface, and so forth. Additionally, illustrated block 36 transmits the virtual to transaction card parameters to a payment network (e.g., Euro, Mastercard, Visa/EMV) component such as, for example, the rule management module 26 (FIG. 1), already discussed. Block 36 may involve retrieving encryption information (e.g., private keys, digital signatures) from a secure storage element of a subscriber mobile device, and using the encryption information to transmit the card value and the mobile usage constraints to the payment network component.

The virtual transaction card parameters may be received on the delegate mobile device at block 38, wherein illustrated block 40 detects one or more purchase attempts. The purchase(s) may be verified against the card parameters at block 42 by, for example, transmitting an authorization request to a cloud based rule management module such as the rule management module 26 (FIG. 1), already discussed. Additionally, any appropriate rule based actions (e.g., notifications, approvals, denials) may be taken.

Figure 3:
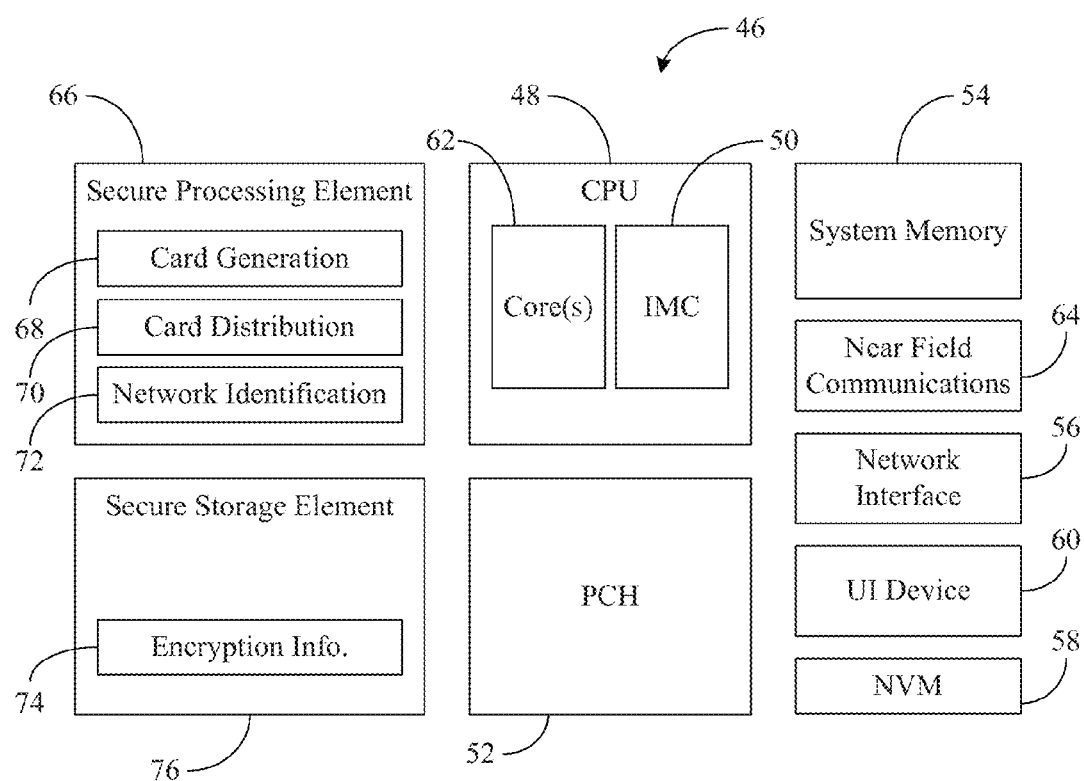
FIG. 3 is a block diagram of a computing system according to an embodiment.

FIG. 3 shows a computing platform/system 46 that may be part of a mobile device having computing functionality (e.g., personal digital assistant/PDA, laptop, desktop, smart tablet), communications functionality (e.g., wireless smart phone), imaging functionality, media playing functionality (e.g., smart television/TV), or any combination thereof (e.g., mobile Internet device/MID). In the illustrated example, the system 46 includes a central processing unit (CPU) 48, an integrated memory controller (IMC) 50, a platform controller hub (PCH) 52, system memory 54, a network controller (e.g., network interface card) 56, non-volatile memory (NVM) 58, and one or more user interface (UI) devices 60. The CPU 48, which may include a core region with one or several processor cores 62, could alternatively communicate with an off-chip variation of the IMC 50, also known as a Northbridge, via a front side bus or a point-to-point fabric that interconnects each of the components in the system 46. In particular, the UI devices 60 may be capable of enabling a user to interact with and perceive the interface from the system 46.

The illustrated PCH 52, sometimes referred to as a Southbridge or South Complex of a chipset, functions as a host controller and communicates with the network controller 56, which could provide off-platform communication functionality for a wide variety of purposes such as, for example, cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The illustrated system 46 also includes a near field communications module 64, which may further coordinate with the PCH 52 to facilitate off-platform communications using, for example, radio frequency identifier (RFID) technology. The PCH 52 may also include one or more wireless hardware circuit blocks to support such functionality.

The NVM 58 may include one or more hard disk drive (HDD) devices, solid state disk (SSD) NAND chips, etc., and may be used to provide high capacity data storage and/or a significant amount of parallelism. There may also be solutions that include NAND controllers implemented as separate ASIC controllers being connected to the PCH 52 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The NVM 58 could also be used as a USB (Universal Serial Bus, e.g., USB Specification 3.0, USB Implementers Forum) flash storage device.

The illustrated system 46 also includes a secure processing element 66 that runs an embedded operating system (OS) such as Java Card OpenPlatform (JCOPO) or Smart-Cafe OS from NXP Semiconductors, Eindhoven, The Netherlands. In one example, the embedded OS can be run securely without involving any host OS running on the CPU 48. The illustrated secure processing element 66 includes a card generation module 68 configured to generate a virtual transaction card based on a card value and one or more mobile usage constraints including a time bounded policy, wherein the virtual transaction card is to be invalid if the time bounded policy is not satisfied. Other policies such as a location bounded policy and transaction type policy may also be used. Of particular note is that the virtual transaction card may be generated without involving a third party or point of sale terminal.

The secure processing element 66 may also include a card distribution module 70 configured to transmit the virtual transaction card to a delegate mobile device. The virtual transaction card may be transmitted to the delegate mobile device via, for example, the near field communications module 64, the network controller 56, and so forth. The illustrated secure processing element 66 also includes a network identification module 72 configured to transmit the card value and the one or more mobile usage constraints to a payment network component. In one example, the network identification module 72 retrieves encryption information 74 from a secure storage element 76, and uses the encryption information 74 and the network controller 56 to communicate with the payment network component. The card value and one or more mobile usage constraints may be obtained from an account holder/subscriber 12 such as the subscriber 12 (FIG. 1) via the UI devices 60.

Thus, techniques described herein may enable credit/debit card owners to set spending limits for delegate card users, limit where the card can be used (e.g., by genre, brick and mortar store, location, web site, etc.), limit the number of transactions the delegate can make, monitor spending activity, approve individual expenses in real-time through a payment notification and approval process, receive information on how the delegate is attempting to use the owner's card, and so forth. The technology may be effectively used by either issuer banks or by EMV to enable users to generate small value transactions cards, pre-paid cards, or credit cards. In addition, the transaction card generating application may run in a secure element via a mobile wallet option. The mobile wallet option may also send messages to a payment network (such as EMV) and/or to an issuer bank either as encrypted SMS (short messaging service, text) message or an IP (Internet Protocol) connection message.

Embodiments may therefore involve a method of authorizing transactions in which a virtual transaction card is generated based on a card value and one or more mobile usage constraints including a time bounded policy. The virtual transaction card may be invalid if the time bounded policy is not satisfied. The method may further provide for transmitting the virtual transaction card to a delegate mobile device.

Additionally, the virtual transaction card may be generated without involving a third party or point of sale terminal.

In addition, the virtual transaction card may be generated further based on a location bounded policy, wherein the virtual transaction card is invalid if the location bounded policy is not satisfied.

Moreover, the virtual transaction card may be generated further based on a transaction type policy, wherein the virtual transaction card is invalid if the transaction type policy is not satisfied.

Additionally, the virtual transaction card may be generated further based on an additional card policy, wherein the virtual transaction card is invalid if the additional card policy is not satisfied.

Additionally, the virtual transaction card may be generated further based on an authentication policy, wherein the virtual transaction card is invalid if the authentication policy is not satisfied.

Moreover, the method may provide for transmitting the card value and the one or more mobile usage constraints to a payment network component.

In addition, a secure processing element of a subscriber mobile device may be used to generate the virtual transaction card, transmit the virtual transaction card to the delegate mobile device, and transmit the card value and the one or more mobile usage constraints to the payment network component.

Additionally, the method may provide for retrieving encryption information from a secure storage element of a subscriber mobile device, and using the encryption information to transmit the card value and the one or more mobile usage constraints to the payment network component.

Additionally, the method may provide for receiving user input via a user interface of a subscriber mobile device, identifying the card value based on the user input, and identifying the one or more mobile usage constraints based on the user input.

In addition, the virtual transaction card may be transmitted to the delegate mobile device via a near field communications module of a subscriber mobile device.

Moreover, the virtual transaction card may be transmitted to the delegate mobile device via a network interface.

Embodiments may also involve a method of authorizing transactions comprising receiving user input via a user interface of a subscriber mobile device, and identifying a card value based on the user input. The method may also provide for identifying one or more mobile usage constraints including a time bounded policy based on the user input, and using a secure processing element of the subscriber mobile device to generate a virtual transaction card based on the card value and the one or more mobile usage constraints. In one example, the virtual transaction card is invalid if the time bounded policy is not satisfied, and the virtual transaction card is generated without involving a third party or point of sale terminal. The method may also involve transmitting the virtual transaction card to a delegate mobile device, retrieving encryption information from a secure storage element of the subscriber mobile device, and using the encryption information and the secure processing element to transmit the card value and the one or more mobile usage constraints to a payment network component.

Additionally, the virtual transaction card may be generated further based on a location bounded policy, wherein the virtual transaction card is invalid if the location bounded policy is not satisfied.

In addition, the virtual transaction card may be generated further based on a transaction type policy, wherein the virtual transaction card is invalid if the transaction type policy is not satisfied.

Additionally, the virtual transaction card may be generated further based on an additional card policy, wherein the virtual transaction card is invalid if the additional card policy is not satisfied.

Additionally, the virtual transaction card may be generated further based on an authentication policy, wherein the virtual transaction card is invalid if the authentication policy is not satisfied.

Moreover, the virtual transaction card may be transmitted to the delegate mobile device via a near field communications module of a subscriber mobile device.

Moreover, the virtual transaction card may be transmitted to the delegate mobile device via a network interface.

In addition, embodiments may include at least one machine readable medium comprising a plurality of instructions that in response to being executed on a computing device, cause the computing device to carry out a method according to any one of the aforementioned embodiments.

Additionally, embodiments may include a subscriber mobile device arranged to perform a method according to any one of the aforementioned embodiments.

Embodiments may also include a subscriber mobile device having a card generation module to generate a virtual transaction card based on a card value and one or more mobile usage constraints including a time bounded policy, wherein the virtual transaction card is to be invalid if the time bounded policy is not satisfied. The subscriber mobile device may also include a card distribution module to transmit the virtual transaction card to a delegate mobile device.

Embodiments may also include at least one computer readable storage medium having a set of instructions which, if executed, cause a computer to generate a virtual transaction card based on a card value and one or more mobile usage constraints including a time bounded policy. The virtual transaction array be invalid if the time bounded policy is not satisfied, and the instructions may cause a computer to transmit the virtual transaction card to a delegate mobile device.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multiprocessor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be functional, compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. A method of authorizing transactions comprising:
receiving, by a host operating system (OS) running on a processor of a subscriber mobile device into a secure storage element, user input via a user interface of the subscriber mobile device, the secure storage element comprising a non-transitory memory; and
executing, by a secure processing element of the subscriber mobile device, an embedded OS without involving the host OS running on the processor, wherein the secure processing element is implemented in configurable logic or fixed-functionality hardware, and wherein executing the embedded OS without involving the host OS includes:
identifying a card value based on the user input;
identifying one or more mobile usage constraints including a time bounded policy based on the user input;
generating, without involving a third party or point of sale terminal, a virtual transaction card based on the card value and the one or more mobile usage constraints, wherein the virtual transaction card is invalid when the time bounded policy is not satisfied;
transmitting the virtual transaction card to a delegate mobile device;
retrieving, encryption information from the secure storage element of the subscriber mobile device; and
transmitting, using the encryption information, an encrypted representation of the card value and the one or more mobile usage constraints to a payment network component.

2. The method of claim 1, further comprising generating the virtual transaction card further based on a location bounded policy, wherein the one or more mobile usage constraints includes the location bounded policy, and wherein the virtual transaction card is invalid if the location bounded policy is not satisfied.

3. The method of claim 1, wherein the virtual transaction card is generated further based on a transaction type policy, wherein the virtual transaction card is invalid if the transaction type policy is not satisfied.

4. The method of claim 1, wherein the virtual transaction card is generated further based on an additional card policy, wherein the virtual transaction card is invalid if the additional card policy is not satisfied.

5. The method of claim 1, wherein the virtual transaction card is generated further based on an authentication policy, wherein the virtual transaction card is invalid if the authentication policy is not satisfied.

6. The method of claim 1, wherein transmitting to the delegate mobile device is via a near field communications module of the subscriber mobile device, and wherein the near field communications module coordinates with a controller hub to facilitate off-platform communications using radio frequency identifier (RFID) technology.

7. The method of claim 1, wherein the virtual transaction card is transmitted to the delegate mobile device via a network interface of the subscriber mobile device.

8. A subscriber mobile device comprising:
a user interface coupled to a processor to run a host operating system (OS) and a secure storage element to receive and store user input, the secure storage element comprising a non-transitory memory;
a secure processing element to execute an embedded OS without involving the host OS, wherein the secure processing element is implemented in configurable logic or fixed-functionality hardware, the secure processing element comprising:
a card generation module to identify without involving the host OS a card value and one or more mobile usage constraints based on the user input, and generate without involving the host OS, without involving a third party or point of sale terminal, a virtual transaction card based on the card value and the one or more mobile usage constraints including a time bounded policy, wherein the virtual transaction card is to be invalid when the time bounded policy is not satisfied; and
a card distribution module to retrieve without involving the host OS the encryption information, transmit without involving the host OS the virtual transaction card to a delegate mobile device, and transmit without involving the host OS, using encryption information, an encrypted representation of the card value and the one or more mobile usage constraints to a payment network component.

9. The subscriber mobile device of claim 8, wherein the one or more mobile usage constraints are to include a location bounded policy, wherein the card generation module is to further generate the virtual transaction card based on the location bounded policy, wherein the virtual transaction card is to be invalid if the location bounded policy is not satisfied.

10. The subscriber mobile device of claim 8, wherein the card generation module is to generate the virtual transaction card further based on a transaction type policy, wherein the virtual transaction card is to be invalid if the transaction type policy is not satisfied.

11. The subscriber mobile device of claim 8, wherein the card generation module is to generate the virtual transaction card further based on an additional card policy, wherein the virtual transaction card is to be invalid if the additional card policy is not satisfied.

12. The subscriber mobile device of claim 8, wherein the card generation module is to generate the virtual transaction card further based on an authentication policy, wherein the virtual transaction card is to be invalid if the authentication policy is not satisfied.

13. The subscriber mobile device of claim 8, further including a network notification module coupled to a controller hub to transmit the card value and the one or more mobile usage constraints to the payment network component, wherein the near field communications module is to coordinate with the controller hub to facilitate off-platform communications using radio frequency identifier (RFID) technology.

14. The subscriber mobile device of claim 13, wherein the network notification module is incorporated into the secure processing element.

15. The subscriber mobile device of claim 13, wherein the network notification module is to retrieve the encryption information from the secure storage element and use the encryption information to transmit the card value and the one or more mobile usage constraints to the payment network component.

16. The subscriber mobile device of claim 8, further including a near field communications module coupled to a controller hub, wherein the virtual transaction card is to be transmitted to the delegate mobile device via the near field communications module, wherein the near field communications module is to coordinate with the controller hub to facilitate off-platform communications using radio frequency identifier (RFID) technology.

17. The subscriber mobile device of claim 8, further including a network interface, wherein the virtual transaction card is to be transmitted to the delegate mobile device via the network interface.

18. At least one non-transitory computer readable storage medium comprising a set of instructions which, if executed, cause a computer to:
receive, by a host operating system (OS) associated with a processor of a subscriber mobile device into a secure storage element, user input via a user interface, the secure storage element is to be a non-transitory memory; and
execute, by a secure processing element of the subscriber mobile device, an embedded OS without involving the host OS, wherein the secure processing element is to be implemented in configurable logic or fixed-functionality hardware, wherein the secure processing element without involving the host OS is to:
identify a card value based on the user input;
identify one or more mobile usage constraints including a time bounded policy based on the user input;
generate, without involving a third party or point of sale terminal, a virtual transaction card based on the card value and the one or more mobile usage constraints including the time bounded policy, wherein the virtual transaction card is to be invalid when the time bounded policy is not satisfied;
transmit the virtual transaction card to a delegate mobile device;
retrieve encryption information from the secure storage element of the subscriber mobile device; and
transmit, using the encryption information, the card value and the one or more mobile usage constraints to a payment network component.

19. The at least one non-transitory computer readable storage medium of claim 18, wherein the one or more mobile usage constraints are to include a location bounded policy, wherein the virtual transaction card is to be generated further based on the location bounded policy, wherein the virtual transaction card is to be invalid if the location bounded policy is not satisfied.

20. The medium of claim 18, wherein the virtual transaction card is to be generated further based on a transaction type policy, wherein the virtual transaction card is to be invalid if the transaction type policy is not satisfied.

21. The medium of claim 18, wherein the virtual transaction card is to be generated further based on an additional card policy, wherein the virtual transaction card is to be invalid if the additional card policy is not satisfied.

22. The medium of claim 18, wherein the card generation module is to generate the virtual transaction card further based on an authentication policy, wherein the virtual transaction card is to be invalid if the authentication policy is not satisfied.

23. The at least one non-transitory computer readable storage medium of claim 18, wherein the secure processing element is to transmit the virtual transaction card to the delegate mobile device via a near field communications module of the subscriber mobile device, wherein the near field communications module is to coordinate with a controller hub to facilitate off-platform communications using radio frequency identifier (RFID) technology.

* * * * *